(No Model.)  
4 Sheets—Sheet 1.

W. R. WEBSTER.
FORGING MACHINE.

No. 557,922.  
Patented Apr. 7, 1896.

WITNESSES:  
INVENTOR  
William R. Webster (No Model.) 4 Sheets—Sheet 2.
W. R. WEBSTER.
FORGING MACHINE.
No. 557,922. Patented Apr. 7, 1896.
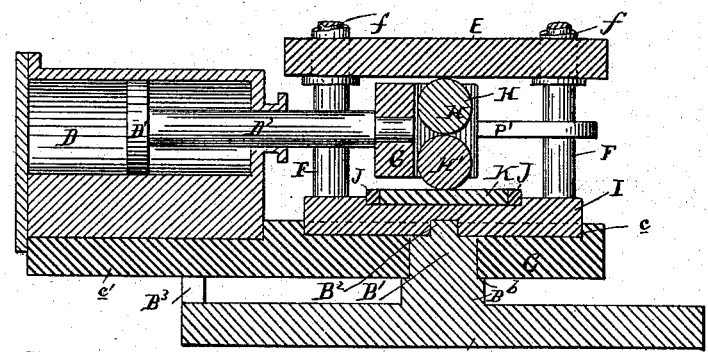
FIG.3.
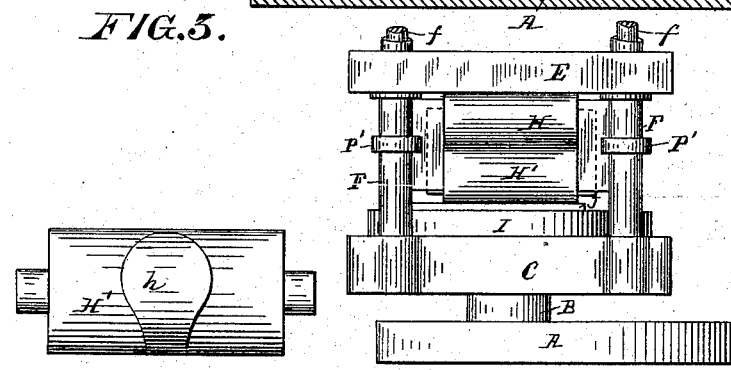
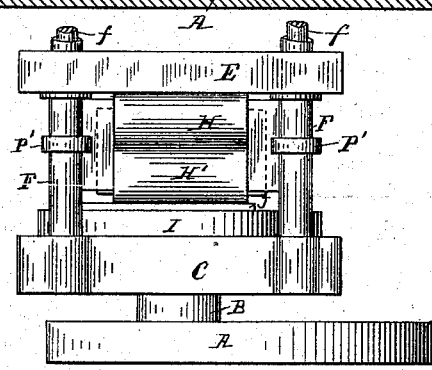
FIG.4.
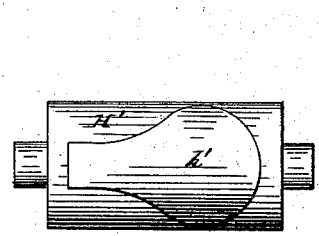
FIG.6.
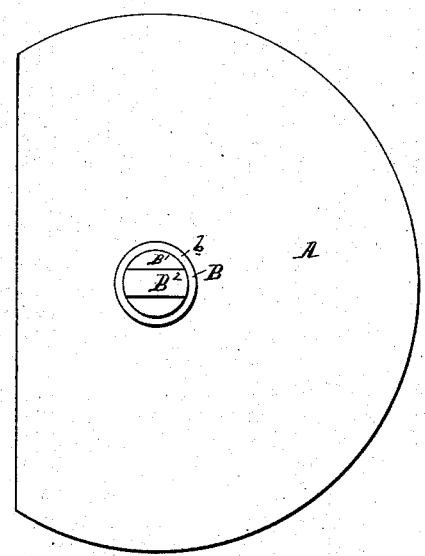
FIG.7.     FIG.5.
WITNESSES:  INVENTOR
William R. Webster
by his attorney
Francis T. Chambers (No Model.) 4 Sheets—Sheet 3.

W. R. WEBSTER.
FORGING MACHINE.

No. 557,922. Patented Apr. 7, 1896.

WITNESSES:

INVENTOR
William R. Webster
by his attorney
Francis T. Chambers (No Model.)  4 Sheets—Sheet 4.

W. R. WEBSTER.
FORGING MACHINE.

No. 557,922.  Patented Apr. 7, 1896.

WITNESSES:

INVENTOR
William R. Webster

UNITED STATES PATENT OFFICE.

WILLIAM R. WEBSTER, OF PHILADELPHIA, PENNSYLVANIA.

FORGING-MACHINE.

SPECIFICATION forming part of Letters Patent No. 557,922, dated April 7, 1896.

Application filed May 27, 1890. Serial No. 353,309. (No model.)

*To all whom it may concern:*

Be it known that I, WILLIAM R. WEBSTER, of Philadelphia, county of Philadelphia, State of Pennsylvania, have invented a certain new and useful Improved Forging-Machine, of which the following is a true and accurate description, reference being had to the drawings, which form a part of this specification.

My invention relates to forging-machines, and my improved apparatus is peculiarly, though not solely, adapted for use in the manufacture of eyebars.

My machine is intended to be used in connection with forgings which are brought approximately to form in another apparatus or by other means, said forgings being then removed to my improved machine, whereby they are subjected to the last perfecting operation and made to assume the precise shape desired.

The nature of my improvement will be best understood as described in connection with the drawings, in which they are illustrated, and the novel features which I desire to protect by Letters Patent are hereinafter clearly set out in the claims.

Figure 1:
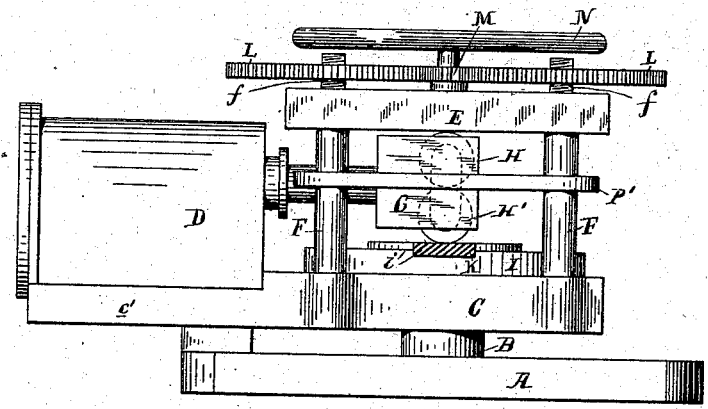
Figure 2:
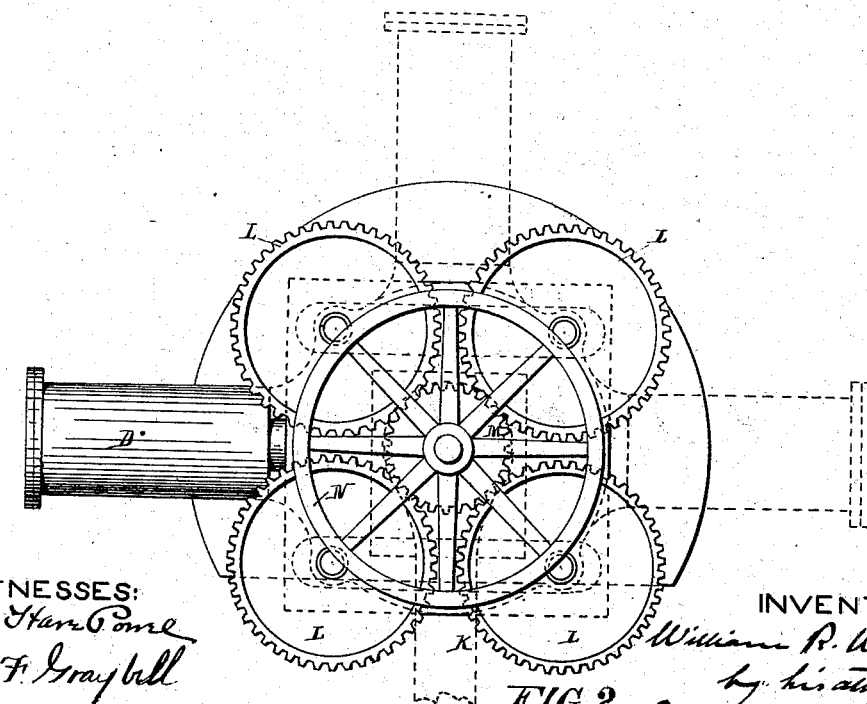
Figure 9:
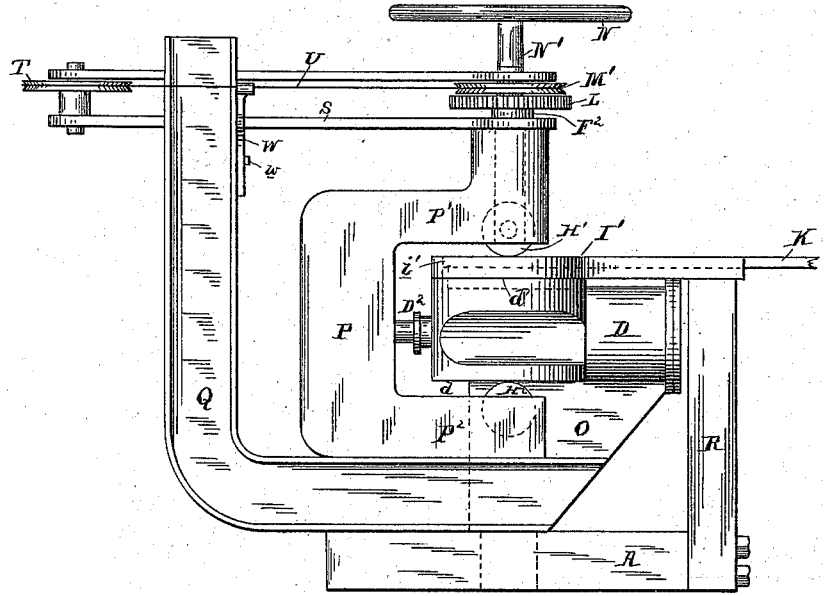
Figure 10:
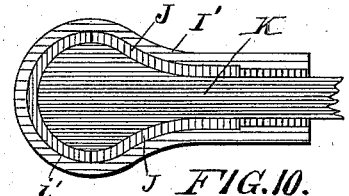
Figure 9:
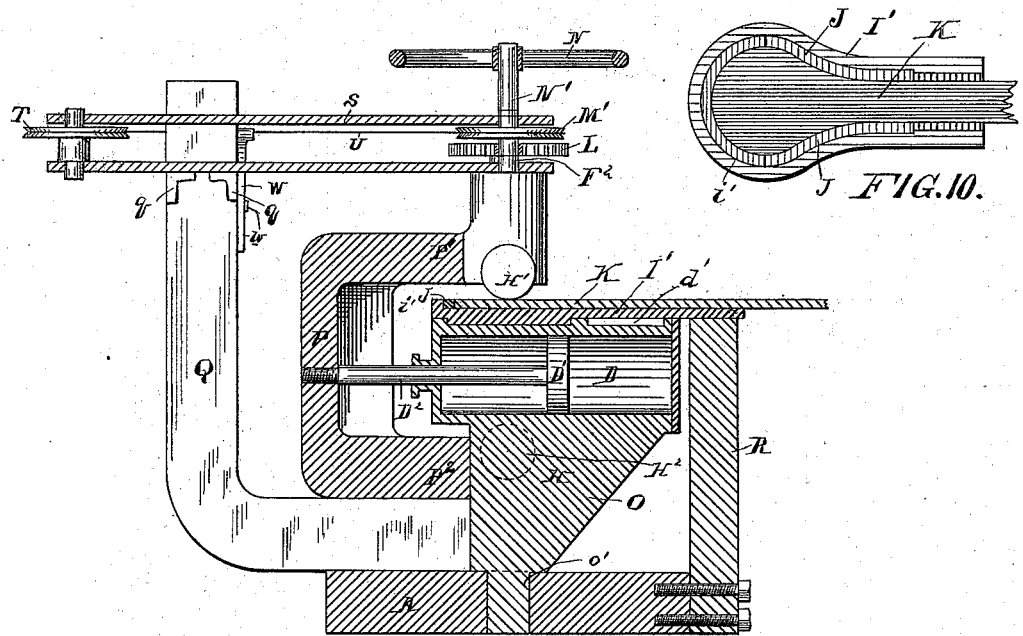
Figure 11:
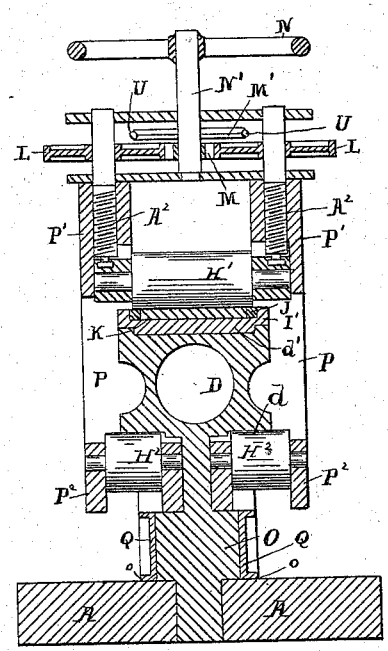
Figure 12:
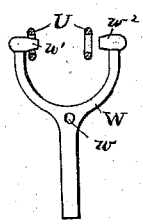

In the drawings, Figure 1 is a side elevation of my improved apparatus; Fig. 2, a plan view thereof; Fig. 3, a vertical central section; Fig. 4, a front elevation; Fig. 5, a plan of the base-plate; Figs. 6 and 7, views of peculiar rolls adapted for use in connection with my apparatus; Fig. 8, a side elevation of a modified machine embodying my improvements; Fig. 9, a similar view partly in section; Fig. 10, a plan view of the die used in connection with the machine shown in Figs. 8 and 9. Fig. 11 is an elevation of the machine shown in Figs. 8 and 9, and Fig. 12 is a view showing a clutch used in said machine.

A is the base-plate, which, as shown in Fig. 3, is provided with a central projection B, upon a shouldered portion B' of which the base-plate C of the housing is pivoted, while a projection B² serves to hold the plate I, in which is formed the die.

C, as already stated, is the main or base plate of the housing. It is pivoted on the projection B' and, as shown in Fig. 3, has a circular cavity $c$ formed in it concentric with the pivot B'. The projecting end $c'$ of the plate C sustains a cylinder D, in which is secured the piston D' and the piston-rod D².

B³ is a flange of the plate A, on which the end $c'$ of the plate C can rest as it turns on the pivot B'.

E is a plate, which is secured to the die-plate I by means of rods F F, having threaded ends $f$.

G is a housing or support for rolls H H', said housing being secured on the end of the piston-rod D², and the rolls H H' resting, respectively, against the plate E and against the die in the plate I, or the work resting in the die. The plate I is provided on its under side with a cavity $i$, which fits over the projection B² and has formed in it a die-cavity $i'$.

J J are cheek-pieces fitting in the die-cavity and forming the walls of the die proper. These are conveniently made adjustable, so as to adapt the die-cavity for the manufacture of eyebars or other articles of different sizes.

K represents the work placed in the cavity of the die.

L L, &c., are wheels screwing on the threaded ends $f$ of the rods F F. These wheels are gear-wheels and engage with the central gear-wheel M, which is turned by a hand-wheel N or in any other convenient way, so as to press the plate E down or permit it to rise.

The eyebar is placed in the die-cavity, and the housing G, carrying with it the cylinder and the rolls H H', is then moved on the pivot B' until the rolls are in position to roll the eyebar in the direction required. Steam or water is then admitted to the cylinder, and the housing or bearing G, carrying the rolls H H', caused to move backward and forward over the work, the roll H acting directly upon the face of the eyebar, and at the same time the plate E is pressed gradually downward, the result being that the eyebar-head is rolled out to fill and fit the die. If it is desired to roll it in another direction, the housing G is turned and the same operation continued. In this way the rolling action can be both transverse and longitudinal or can take place in a line intermediate between them and the eyebar can readily be made to fill the cavity of the die.

It is desirable in some cases that the face of the roll H', which acts upon the head of the eyebar, should be provided with projections, such as $h$ and $h'$, Figs. 6 and 7, these projections corresponding with the outline of the die-cavity and fitting into the said cavity.

Referring next to the modified form of the machine shown in Figs. 8, 9, and 11, the cylinder D is supported upon a base O, which in turn is pivoted to the base-plate A at $o'$. The die I' rests on top (marked $d'$) of the cylinder D, and is held stationary by the upright brace R. A U-shaped forging or casting P P' P² is formed so as pass above and below the cylinder D. The pressure-roll H' is secured in its upper arm P', so as to pass over the face of the die, and rolls H² are secured to its lower arm, so as to press upward against projecting flanges $d$ of the cylinder D. The U-shaped forging P is attached to the piston-rod D², as shown, and is given a reciprocating motion by the action of the piston in the cylinder D. The roll H' is pressed down by means of screw-rods A², which are actuated by gear-wheels L, which in turn are actuated by a common gear M, attached to the spindle N', which spindle can be turned either by the hand-wheel N or by a chain U passing over a sprocket-wheel M' and a sprocket-wheel T, which wheel T is attached to a frame S, which moves with the U-shaped casting P, and is supported and guided by a standard Q, which is attached to the pivoted support O, so as to turn with it. $q\ q$ indicate angle-irons serving to support frame S'. By means of this chain the reciprocation of the support S in the standard Q can readily be made to effect an automatic or other feed of the roll H. W indicates a clutch which can be moved from side to side on its pivot $w$, so as to engage a projection $w'$ or $w^2$ with the chain. This modified machine, as will be seen, has the same capacity for changing the angular position of the pressure-roll as has the machine first described. The die I' remains stationary, being held by the standard R, and the cylinder D, together with the U-shaped piece P, the standard Q, and the parts connected therewith, can be rotated to any desired angular position with respect to the die.

Having now described my invention, what I claim as new, and desire to protect by Letters Patent, is—

1. In a forging-machine the combination of a die with a pressure-roll arranged to reciprocate over the face of the die and means for changing its relative position with respect to said die, all substantially as specified and so that the work in the die can be rolled in different directions.

2. In a forging-machine, the combination of a stationary die adapted to contain the work, a pressure-roll arranged to reciprocate over the face of the die, bearings for said roll pivoted so as to turn it to various angular positions on the die, and feeding mechanism arranged to depress and elevate the pressure-roll, all substantially as and for the purpose specified.

3. In a forging-machine, the combination of a stationary die, a pressure-roll arranged to act on the face of the die, a cylinder and piston arranged to give the roll a reciprocating movement, a pivoted housing arranged to support the cylinder and pressure-roll, and means for feeding the roll to and from the die.

WILLIAM R. WEBSTER.

Witnesses:
   LEWIS R. DICK,
   H. F. GRAYBILL.